United States Patent [19]

Mitani

[11] Patent Number: 5,343,540
[45] Date of Patent: Aug. 30, 1994

[54] METHOD FOR DETECTING POSITIONS OF CONSECUTIVE BITS SET TO PREDETERMINED CODES

[75] Inventor: Yasushi Mitani, Kanagawa, Japan

[73] Assignee: Fuji Photo Film Co., Ltd., Kanagawa, Japan

[21] Appl. No.: 89,605

[22] Filed: Jul. 12, 1993

Related U.S. Application Data

[63] Continuation of Ser. No. 993,470, Dec. 15, 1992, which is a continuation of Ser. No. 651,088, Feb. 6, 1991.

[30] Foreign Application Priority Data

Feb. 7, 1990 [JP] Japan .................. 2-28000

[51] Int. Cl.$^5$ .............................................. G06K 9/36
[52] U.S. Cl. .................. 382/56; 358/261.1; 364/715.11
[58] Field of Search ............ 382/56, 62; 358/261.1, 358/261.2, 261.3; 364/715.1, 715.11, 247; 377/33, 45

[56] References Cited

U.S. PATENT DOCUMENTS

| | | | |
|---|---|---|---|
| 3,963,098 | 6/1976 | Lewis et al. | 187/29 R |
| 4,247,891 | 1/1981 | Flynn et al. | 364/715.1 |
| 4,542,413 | 9/1985 | Rallapalli et al. | 341/63 |
| 4,568,983 | 2/1986 | Bobick | 358/261.3 |
| 4,740,994 | 4/1988 | Ouchi | 358/261.1 |
| 4,748,575 | 5/1988 | Ashkin et al. | 364/715.1 |
| 4,841,299 | 6/1989 | Weaver | 341/63 |
| 5,111,415 | 5/1992 | Shackleford | 364/71.04 |

Primary Examiner—David K. Moore
Assistant Examiner—Matthew C. Bella
Attorney, Agent, or Firm—Sughrue, Mion, Zinn, Macpeak & Seas

[57] ABSTRACT

A first bit length representing the number of bits set to a predetermined code is found, which occur consecutively starting with the least significant bit of a first word among a plurality of words in a signal and continuing toward the most significant bit of the first word. From a second word following on the lower order side than the first word, a second bit length representing the number of bits set to the predetermined code is found, which occur consecutively starting with the most significant bit of a second word and continuing toward the least significant bit of the second word. A sum bit length is then calculated by adding the second bit length to the first bit length and compared with the bit length constituting a single word. From the results of the comparison, the position in the signal is detected at which bits set to the predetermined code occur consecutively by a length not less than the bit length constituting a single word.

12 Claims, 3 Drawing Sheets

METHOD FOR DETECTING POSITIONS OF CONSECUTIVE BITS SET TO PREDETERMINED CODES

This is a continuation of application Ser. No. 07/993,470 filed Dec. 15, 1992, which is a continuation of U.S. application Ser. No. 07/651,088 filed on Feb. 6, 1991.

BACKGROUND OF THE INVENTION

1. Field of the Invention

This invention relates to a method for detecting a position of consecutive bits set to a predetermined code wherein, from a signal constituted of a plurality of words, the position in the signal is detected at which bits set to a predetermined code occur consecutively by a length not less than the bit length constituting a single word.

2. Description of the Prior Art

In general, digital signals representing images, or the like, are composed of enormous amounts of information. Therefore, in general, before the digital signals are stored on a storage medium or are transmitted between signal processing apparatuses, they are compressed. The digital signals are compressed by restricting redundancy of the signals by the utilization of the characteristics that the signal components representing the neighboring picture elements of a single image have a high correlation to each other. During the compression of a digital signal, a predetermined number of consecutive bits, which have been set to a predetermined code, are often inserted into the top of each set of signal components of the digital signal, which has been compressed, in order to indicate the location of the top of each set. The predetermined number is not less than the number of bits constituting a single word. For example, in cases where a digital signal was detected from an image by scanning the image along a plurality of main scanning lines, a series of signal components of a compressed digital signal, which represent picture elements in the image located along a single main scanning line, are taken as one set. Thereafter, a predetermined number of bits, which number is not less than the number of bits constituting a single word and is, for example, at least 17, are set to a predetermined code (i.e. 0 or 1) and consecutively inserted into the top of each set of signal components.

The number of consecutive bits will herein be often referred to as the bit length.

FIG. 4 is a block diagram showing an example of a series of processes for compressing and recompressing a signal.

With reference to FIG. 4, a digital signal S1, which has been generated by, for example, an image read-out apparatus (not shown) and is made up of a series of signal components representing an image, is fed into a signal compressor 1. In the image read-out apparatus, the digital signal S1 is detected from the image by scanning the image along a plurality of main scanning lines. In the signal compressor 1, a series of signal components of the digital signal S1, which represent picture elements in the image located along each main scanning line, are taken as one set, and signal compression is carried out on each set of signal components. Also, 17 consecutive bits, which have been set to 0, are inserted into the top of each set of signal components. In this manner, a compressed image signal S2 is generated. The compressed image signal S2 is then stored in an image filing apparatus 2, which stores (files) a plurality of compressed digital signals representing images. When necessary, the compressed image signal S2 is read from the image filing apparatus 2 and fed into a zero length detecting circuit 3 and a signal recompressor 4. The zero length detecting circuit 3 detects at least 17 consecutive bits, which have been set to 0 and are present in the compressed image signal S2, and thereby finds the position of the top of each set of signal components of the digital signal representing picture elements located along a single main scanning line. The zero length detecting circuit 3 feeds information about the position of the top of each set of signal components into the signal recompressor 4. The signal recompressor 4 receives the compressed image signal S2 from the image filing apparatus 2 and recompresses it in accordance with the information, which represents the position of the top of each set of signal components and is received from the zero length detecting circuit 3. The signal recompressor 4 thus generates an recompressed image signal S3, which is approximately identical with the original digital signal S1. (In cases where an irreversible compression process was carried out on the original digital signal S1, the recompressed image signal S3 becomes slightly different from the original digital signal S1.) The recompressed image signal S3 is fed into a CRT display device (not shown), which reproduces a visible image from the recompressed image signal S3 and displays it.

In the example described above, during the compression of a digital signal, a predetermined number of consecutive bits, which have been set to a predetermined code (0), are inserted into the top of each set of signal components of the digital signal, which has been compressed, in order to indicate the location of the top of each set. Also when, for example, a digital signal is transmitted between signal processing apparatuses, bits which have been set to, e.g., 0 are consecutively inserted by a predetermined length into the top of a group of signal components of the digital signal in order to indicate the location of the top of the group.

In cases where, for example, a digital signal is subjected to compression and extension processing or is transmitted between signal processing apparatuses, it is necessary to detect with, for example, a zero length detecting circuit whether bits which have been set to, e.g., 0 occur or do not occur consecutively at least by a predetermined length in a digital signal.

FIG. 5 is a diagram showing an example of a conventional zero length detecting circuit, which is employed to detect whether bits which have been set to 0 occur or do not occur consecutively at least by a predetermined length in a digital signal.

With reference to FIG. 5, a shift register 5 is constituted of a parallel-input, serial-output type 16-bit shift register. A digital signal S4 constituted of a plurality of words, such as the compressed image signal S2 shown in FIG. 4, is sequentially fed in units of a single work into the shift register 5. In this example, one word is constituted of 16 bits. Each time a single word is fed into the shift register 5, 16 pulses of a clock signal CL are fed into the shift register 5. In this manner, the data in the shift register 5 is serially fed into a shift register 6. The shift register 6 is of the serial-input, parallel-output type and has a bit length, which is determined in accordance with how many consecutive bits set to 0 should at least be detected. In cases where all of the bits in the shift register 6 become 0, a pulse signal shown in FIG. 4 is generated and fed out from a gate circuit 7, which is connected to the parallel output terminals of the shift register 6. In this manner, it can be detected that the bits which have been set to 0 occur consecutively at least by the predetermined length in the digital signal S4.

With the conventional zero length detecting circuit described above, the parallel signal components received in units of a single word are transformed into a serial signal. Therefore, a long time is taken for the zero length to be detected. As a result, the speed, with which a series of processes, .such as signal extension, are carried out, cannot be kept high.

SUMMARY OF THE INVENTION

The primary object of the present invention is to provide a method for detecting a position of consecutive bits set to a predetermined code wherein, from a signal constituted of a plurality of words, the position in the signal is detected quickly at which bits set to a predetermined code (0 or 1) occur consecutively by a length not less than the bit length constituting a single word.

Another object of the present invention is to provide a method for detecting a position of consecutive bits set to a predetermined code, which enables a series of processes, such as signal extension, to be carried out quickly.

The present invention provides a first method for detecting a position of consecutive bits set to a predetermined code wherein, from a signal constituted of a plurality of words, the position in the signal is detected at which bits set to a predetermined code occur consecutively by a length not less than the bit length constituting a single word, the method for detecting a position of consecutive bits set to a predetermined code comprising the steps of:

i) finding a first bit length representing the number of bits set to said predetermined code, which occur consecutively starting with the least significant bit of a first word among the plurality of said words and continuing toward the most significant bit of said first word, ii) finding a second bit length representing the number of bits set to said predetermined code, which occur consecutively starting with the most significant bit of a second word and continuing toward the least significant bit of said second word, said second word following said first word on the lower order side than said first word, iii) calculating a sum bit length by adding said second bit length to said first bit length, iv) comparing said sum bit length with said bit length constituting a single word, and v) from the results of the comparison, detecting the position in the signal at which bits set to said predetermined code occur consecutively by a length not less than said bit length constituting a single word.

The present invention also provides a second method for detecting a position of consecutive bits set to a predetermined code wherein, from a signal constituted of a plurality of words, the position in the signal is detected at which bits set to a predetermined code occur consecutively by a predetermined length larger than the bit length constituting a single word, the method for detecting a position of consecutive bits set to a predetermined code comprising the steps of:

i) finding a first bit length representing the number of bits set to said predetermined code, which occur consecutively starting with the least significant bit of a first word among the plurality of said words and continuing toward the most significant bit of said first word, ii) finding a second bit length representing the number of bits set to said predetermined code, which occur consecutively starting with the most significant bit of a second word and continuing toward the least significant bit of said second word, said second word following said first word on the lower order side than said first word, iii) calculating a sum bit length by adding said second bit length to said first bit length, iv) judging whether said second bit length is equal to or is smaller than said bit length constituting a single word, v) in cases where it has been judged that said second bit length is smaller than said bit length constituting a single word, a) comparing said sum bit length with said predetermined length larger than said bit length constituting a single word, and b) from the results of the comparison, detecting the position in the signal at which bits set to said predetermined code occur consecutively by said predetermined length larger than said bit length constituting a single word, and vi) in cases where it has been judged that said second bit length is equal to said bit length constituting a single word, a) in lieu of said second word, taking a third word, which follows said second word on the lower order side than said second word, as a new second word, b) finding a new second bit length representing the number of bits set to said predetermined code, which occur consecutively starting with the most significant bit of said new second word and continuing toward the least significant bit of said new second word, c) calculating a new sum bit length by adding said new second bit length to said sum bit length, which was calculated by adding the old second bit length to said first bit length, d) when necessary, repeating the operations from said judgment to the calculation of a new sum bit length, e) comparing a sum bit length, which has thus been calculated ultimately, with said predetermined length larger than said bit length constituting a single word, and f) from the results of the comparison between the sum bit length, which has been calculated ultimately, and said predetermined length larger than said bit length constituting a single word, detecting the position in the signal at which bits set to said predetermined Code occur consecutively by said predetermined length larger than said bit length constituting a single word.

The term "word" as used herein means the units of processing of a digital signal. No limitation is imposed on the bit length (i.e. the number of bits) constituting a single word. By way of example, a single word may be constituted of, 4 bits, 8 bits, 16 bits, or 32 bits.

In the second method for detecting a position of consecutive bits set to a predetermined code in accordance with the present invention, when necessary, the operations from the judgment to the calculation of a new sum bit length are repeated. Whether the operations from the judgment to the calculation of a new sum bit length are to be or are not to be repeated is determined in accordance with the relationship between the bit length, which constitutes a single word, and the predetermined length, which is larger than the bit length constituting a single word and is to be detected. For example, in cases where the bit length constituting a single word is 16 and the predetermined length to be detected is 17, the operations from the judgment to the calculation of a new sum bit length need not be repeated for a fourth word, which follows the third word on the lower order side than the third word. In cases where the bit length constituting a single word is 8 and the predetermined length to be detected is 17, it is necessary for the operations from the judgment to the calculation of a new sum bit length to be repeated for the fourth word, which follows the third word on the lower order side than the third word. In cases where the bit length constituting a single word is 8 and the predetermined length to be detected is 25, it is necessary for the operations from the judgment to the calculation of a new sum bit length to be repeated for the fourth word, which follows the third word on the lower order side than the third word, and a fifth word, which follows the fourth word on the lower order side than the fourth word. Of course, the operations from the judgment to the calculation of a new sum bit length may be repeated even if they need not be repeated.

With the first and second methods for detecting a position of consecutive bits set to a predetermined code in accordance with the present invention, a signal is accessed in units of a single word, and the first bit length and the second bit length are found. A sum bit length is then calculated by adding the second bit length to the first bit length. Therefore, all of the signal components of the signal can be processed in the parallel mode. Also, the position in the signal, at which bits set to a predetermined code occur consecutively by a predetermined length, can be detected with a few steps and therefore quickly.

DESCRIPTION OF THE PREFERRED EMBODIMENTS

The present invention will hereinbelow be described in further detail with reference to the accompanying drawings.

Figure 1:
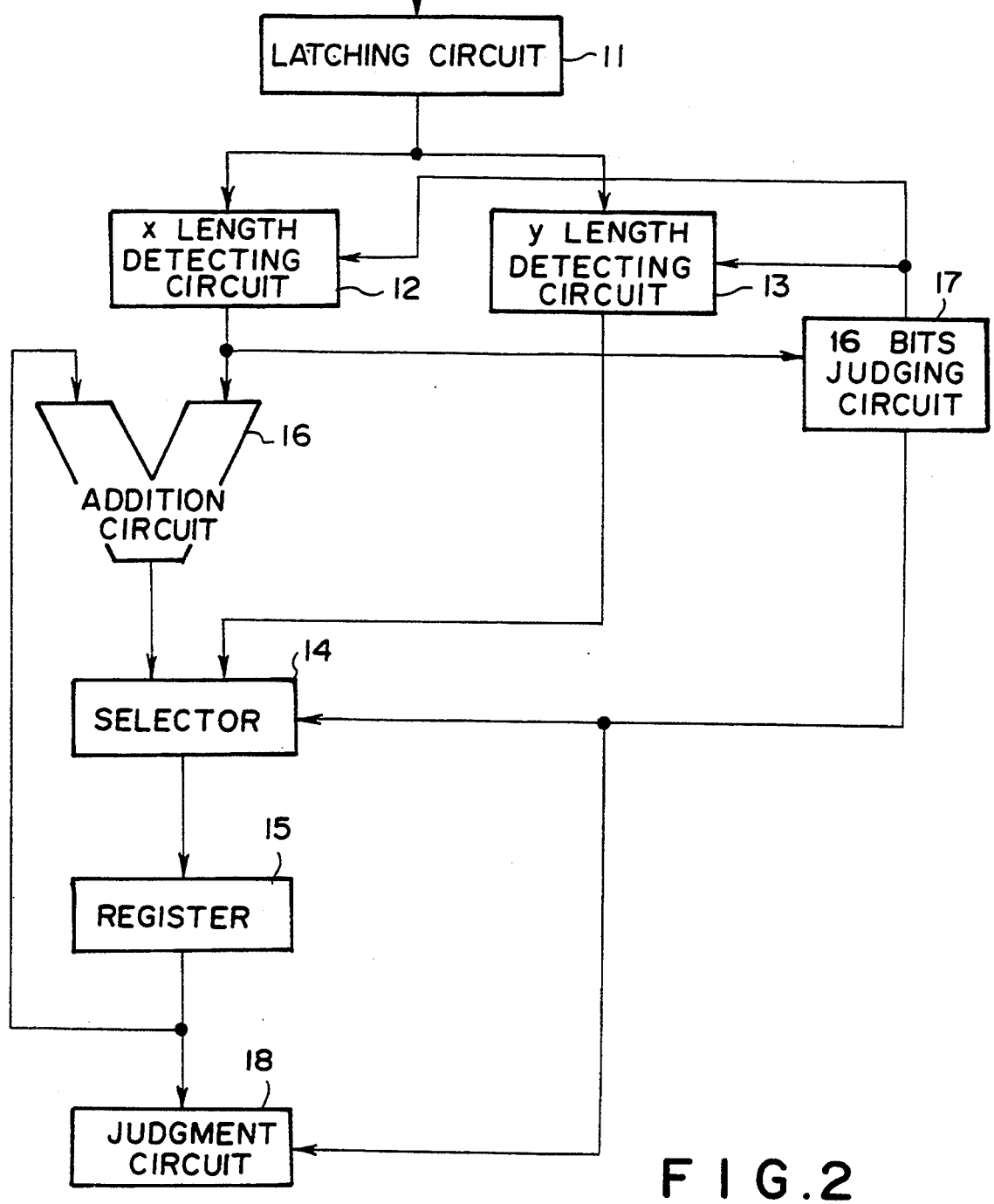
FIG. 1 is a block diagram showing an example of a zero length detecting circuit in which an embodiment of the method for detecting a position of consecutive bits set to a predetermined code in accordance with the present invention is employed.
Figure 2:
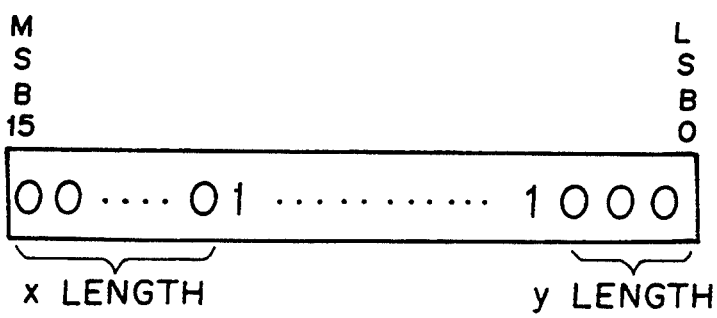
FIG. 2 is an explanatory view showing an example of a single word in a signal, which is constituted of a plurality of words.
Figure 3:
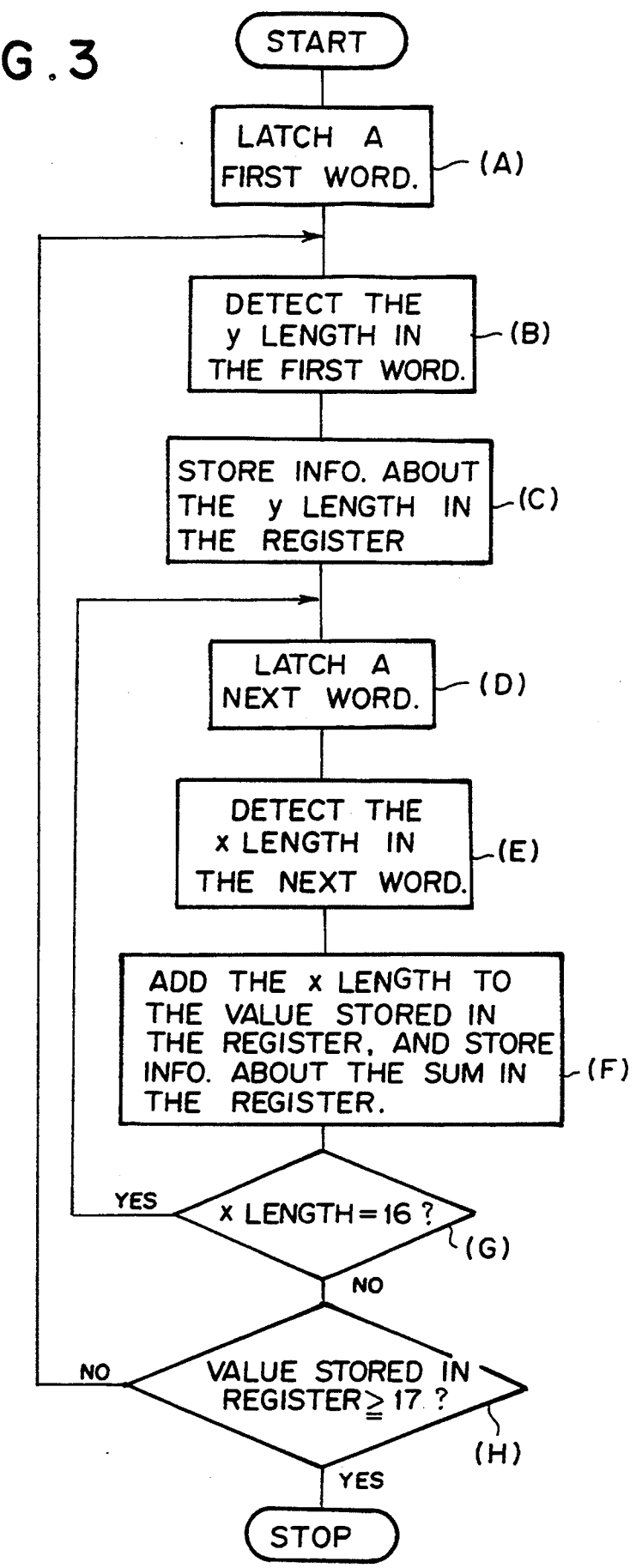
FIG. 3 is a flow chart showing how the zero length detecting circuit shown in FIG. 1 operates.
Figure 4:
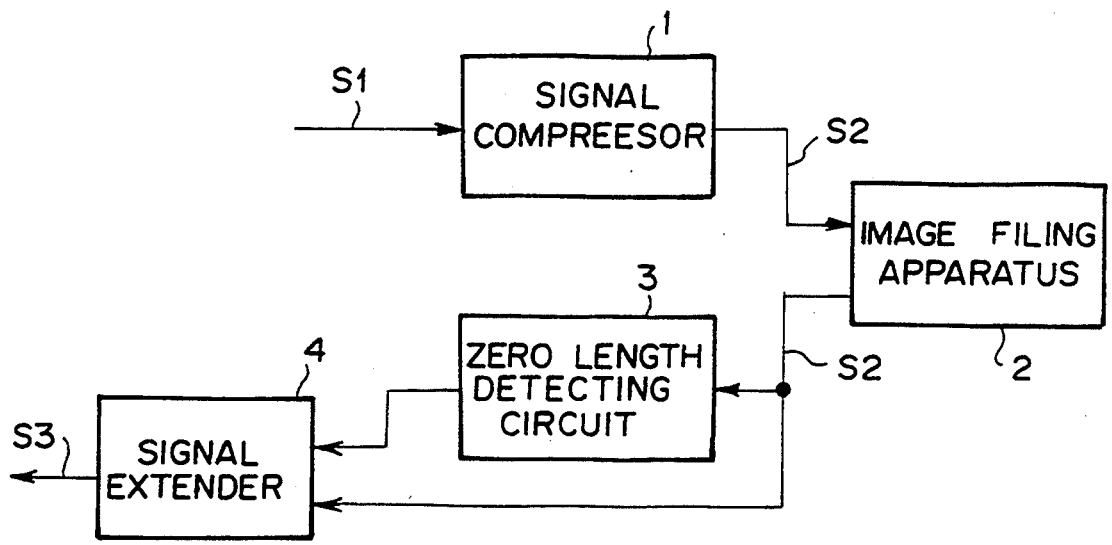
FIG. 4 is a block diagram showing an example of a series of processes for compressing and recompressing a signal.
Figure 5:
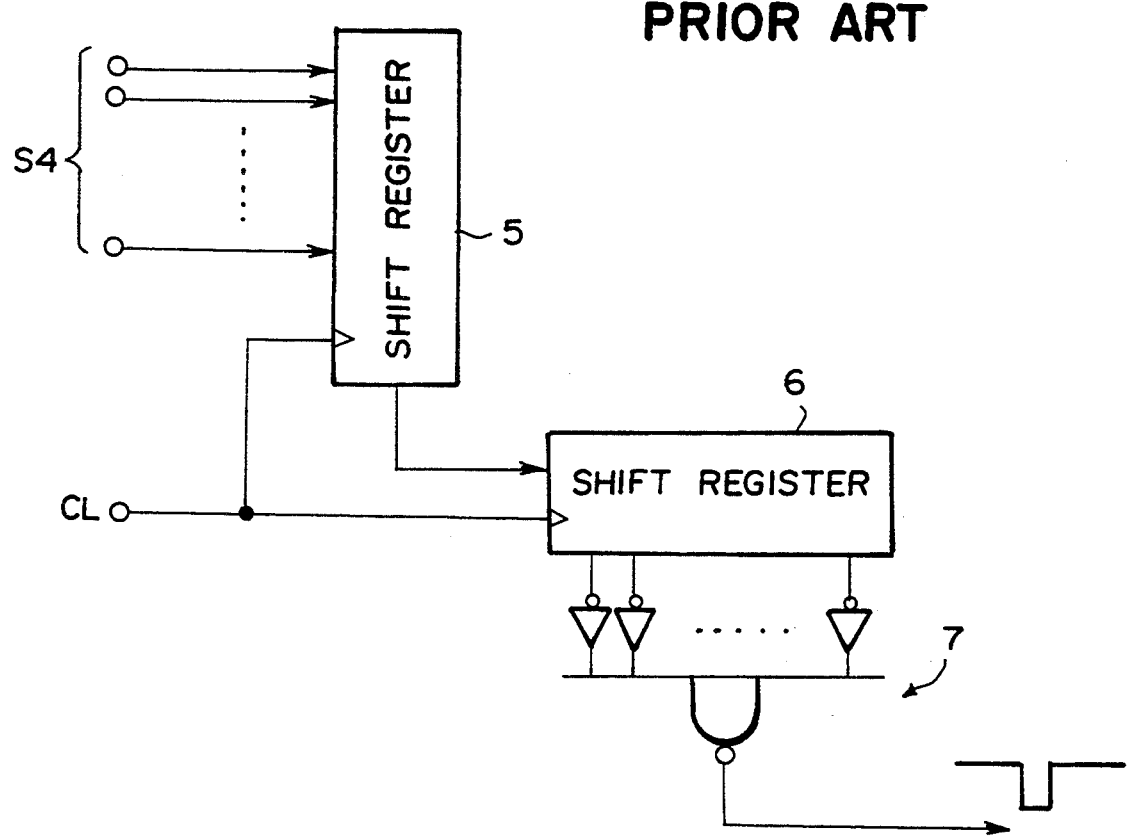
FIG. 5 is a diagram showing an example of a conventional zero length detecting circuit, which is employed to detect whether bits which have been set to 0 occur or do not occur consecutively at least by a predetermined length in a signal.

FIG. 1 is a block diagram showing an example of a zero length detecting circuit in which an embodiment of the method for detecting a position of consecutive bits set to a predetermined code in accordance with the present invention is employed. FIG. 2 is an explanatory view showing an example of a single word in a signal, which is constituted of a plurality of Words. FIG. 3 is a flow chart showing how the zero length detecting circuit shown in FIG. 1 operates.

In this embodiment, a series of signal components of a compressed image signal (digital signal), which represent picture elements in an image located along each main scanning line, are taken as one group. Bits set to 0 have been inserted consecutively by a predetermined length (in this example, 17 bits) into the top of each group of signal components. The position of the top of each group of signal components is detected. As illustrated in FIG. 2, in the compressed image signal, a single word is constituted of 16 bits ranging from the least significant bit (LSB0) to most significant bit (MSB15). As an aid in facilitating the explanation, the bit length (second bit length) representing the number of bits set to 0, which occur consecutively starting with the most significant bit (MSB15) of each word and continuing toward the least significant bit (LSB0) of said word, will hereinbelow be referred to as the "x length". Also, the bit length (first bit length) representing the number of bits set to 0, which occur consecutively starting with the least significant bit (LSB0) of each word and continuing toward the most significant bit (MSB15) of said word, will hereinbelow be referred to as the "y length".

The compressed image signal is fed in units of a single word into a latching circuit 11 and latched therein (step A). The one-word signal, which has been latched in the latching circuit 11 in step A, will hereinbelow be referred to as the first word. The first word, which has been latched in the latching circuit 11, is then fed into an x length detecting circuit 12 and a y length detecting circuit 13. The y length detecting circuit 13 detects the y length in the first word (step B). Information about the y length thus detected is fed into a selector 14 and then into a register 15 (step C). When the information about the y length is fed into the register 15, the selector 14 connects the y length detecting circuit 13 to the register 15. When information about the results of addition obtained from an addition circuit 16 is to be fed into the register 15, the selector 14 connects the addition circuit 16 to the register 15.

Thereafter, the one-word signal (the second word) following the first word on the lower order side of the first word is fed into the latching circuit 11 and latched therein (step D). The second word, which has been latched in the latching circuit 11, is fed into the x length detecting circuit 12 and the y length detecting circuit 13. At this time, the x length detecting circuit 12 detects the x length in the second word (step E). Information about the x length thus detected is fed into an addition circuit 16. The addition circuit 16 also receives the information about the y length in the first word from the register 15. The addition circuit 16 adds the x length in the second word to the y length in the first word (step F). Also, in step F, information about the sum of the x length and the y length is fed from the addition circuit 16 into the register 15. In lieu of the information about the y length in the first word, the information about the sum of the x length and the y length is stored in the register 15. The information about the x length is also fed from the x length detecting circuit 12 into a 16 bits judging circuit 17. The 16 bits judging circuit 17 judges whether the x length is equal to or shorter than the bit length (16 bits) constituting a single word (step G). In accordance with the results of judgment, the 16 bits judging circuit 17 controls the x length detecting circuit 12, the y length detecting circuit 13, the selector 14, and a judgment circuit 18, which will be described later, such that the operations described below may be carried out.

In cases where the 16 bits judging circuit 17 has judged that the x length is shorter than the bit length (16 bits) constituting a single word, the information about the sum of the x length and the y length, which is now stored in the register 15, is fed into the judgment circuit 18. The judgment circuit 18 judges whether the sum of the x length and the y length is or is not at least 17 bits, i.e. whether the part of the signal associated with the sum of the x length and the y length corresponds to or does not correspond to the top of a group of signal components of the digital signal representing picture elements located along a single main scanning line (step H).

In cases where bits set to 0 have been inserted consecutively by a length equal to the bit length (16 bits) constituting a single word into the top of each group of signal components, the judgment as to whether the x length is equal to or shorter than the bit length (16 bits) constituting a single word (step G) need not be carried out. In such cases, in step H, a judgment is made as to whether the sum of the x length and the y length is or is not at least 16 bits, i.e. whether the part of the signal associated with the sum of the x length and the y length corresponds to or does not correspond to the top of a group of signal components of the digital signal representing picture elements located along a single main scanning line.

In cases where it has been judged that the part of the signal associated with the sum of the x length and the y length corresponds to the top of a group of signal components of the digital signal representing picture elements located along a single main scanning line, a series of the processing is completed. Thereafter, the aforesaid processing may be carried out to find the position of the top of a next group of signal components of the digital signal representing picture elements located along the next main scanning line.

In cases where it has been judged by the judgment circuit 18 that the sum of the x length and the y length, which is represented by the information received from the register 15, is smaller than 17 bits, i.e. that the part of the signal associated with the sum of the x length and the y length does not correspond to the top of a group of signal components of the digital signal representing picture elements located along a single main scanning line, the second word, which is latched in the latching circuit 11, is taken as a new first word. The y length in the new first word is then found (step B). Thereafter, the process is carried out in the same manner as that described above.

In cases where the 16 bits judging circuit 17 has judged that the x length in the second word is equal to the bit length (16 bits) constituting a single word, it is possible that bits set to 0 may be present consecutively in the high order part of a third word, which follows on the lower order side than the second word latched in the latching circuit 11. Therefore, the third word is taken as a new second word, and steps D through G are repeated for the new second word. In such cases, because the position in the signal is to be detected at which 17 bits set to 0 occur consecutively, a judgment need not necessarily be made in step G as to whether the x length in the new second word is or is not equal to 16. However, in this embodiment, a judgment is made in step G as to whether the x length in the new second word is or is not equal to 16. In cases where it is judged that the x length in the new second word is equal to the bit length (16 bits) constituting a single word, processing is carried out in the same manner as that described above for a word, which follows on the lower order side than the new second word.

In this embodiment, in the manner described above, the position in the compressed image signal is detected at which at least 17 bits set to 0 occur consecutively. The position of the top of a group of signal components of the digital signal, which represent picture elements located along a single main scanning line, can thereby be detected quickly.

In the embodiment described above, the position in the compressed image signal is detected at which at least 17 bits set to 0 occur consecutively. Alternatively, the position in a digital signal may be detected at which bits set to a code, 1, occur consecutively. Also, the number of consecutive bits, the position of which is to be detected, may be set to any number which is not smaller than the number of bits (i.e. bit length) constituting a single word.

I claim:

1. A method for detecting a position of consecutive bits set to a predetermined code from a signal constituted of a plurality of words, the position being in the signal at which a predetermined number of consecutive bits are set to a predetermined code, said predetermined number of consecutive bits having a length not less than a word bit length which constitutes a signal word, the method comprising the steps of:
 latching a first word from the plurality of words;
 counting in a first direction starting with the least significant bit of said first word the number of consecutive bits corresponding to said predetermined code, and continue counting toward the most significant bit of said first word so as to detect a first bit length,
 latching a second word from the plurality of words;
 counting in a second direction starting with the most significant bit of said second word the number of consecutive bits corresponding to said predetermined code, and continue counting toward the least significant bit of said second word so as to detect a second bit length, the most significant bits of said second word being adjacent to said least significant bits of said first word,
 calculating a sum bit length by adding said second bit length to said first bit length,
 comparing said sum bit length with said word bit length, and determining from the results of the comparison, the position in the signal at which consecutive bits correspond to said predetermined code.

2. A method as defined in claim 1, wherein said signal is an image signal representing an image.

3. A method as defined in claim 2, wherein said image signal is detected from the image by scanning the image along a plurality of main scanning lines, and said position in the signal, at which consecutive bits correspond to a predetermined code having a bit length not less than the word bit length, corresponds to the top of each group of signal components of the image signal, which represent picture elements in the image located along a single main scanning line.

4. A method as defined in claim 1, wherein said signal is a compressed image signal, which is obtained from compression processing carried out on an image signal representing an image.

5. A method as defined in claim 5, wherein said image signal was detected from the image by scanning the image along a plurality of main scanning lines, and said position in the signal, at which consecutive bits correspond to a predetermined code having a bit length not less than the word bit length, corresponds to the top of each group of signal components of the compressed image signal, which represent picture elements in the image along a single main scanning line.

6. A method for detecting a position of consecutive bits set to a predetermined code from a signal constituted of a plurality of words, the position being in the signal at which a predetermined number of consecutive bits are set to a predetermined code, said predetermined number of consecutive bits having a predetermined length larger than a word bit length which constitutes a signal word, the method comprising the steps of:
  i) latching a first word from the plurality of words;
  ii) counting in a first direction starting with the least significant bit of said first word the number of consecutive bits corresponding to said predetermined code, and continue counting toward the most significant bit of said first word so as to detect a first bit length,
  iii) latching a second word from the plurality of words;
  iv) counting in a second direction starting with the most significant bit of said second word the number of consecutive bits corresponding to said predetermined code, and continue counting toward the least significant bit of said second word so as to detect a second bit length, the most significant bits of said second word being adjacent to the least significant bits of said first word,
  v) calculating a sum bit length by adding said second bit length to said first bit length,
  vi) judging whether said second bit length is equal to or less than said word bit length,
  vii) in cases where said second bit length is smaller than said word bit length,
    a) comparing said sum bit length with said predetermined length which is larger than said word bit length,
    b) determining from the results of the comparison, the position in the signal at which consecutive bits correspond to said predetermined code with a predetermined length which is larger than said word bit length, and
    c) in cases where the sum bit length is not greater than or equal to said predetermined length,
      1) making said second word a new first word, and
      2) repeating the above method steps beginning with step
  (ii), and
  viii) in cases where it has been judged that said second bit length is equal to said word bit length,
    a) latching a third word in place of said second word, which follows said second word, as a new second word,
    b) counting starting with the most significant bit of said new second word the number of consecutive bits which correspond to said predetermined code, and continue counting toward the least significant bit of said new second word so as to detect a new second bit length,
    c) calculating a new sub bit length by adding said new second bit length to said sum bit length, which was calculated by adding the old second bit length to said first bit length,
    d) repeating the operations from said judgement step (vi) to the calculation of a new sum bit length step (viii)(c),
    e) comparing the sum bit length, which has thus been calculated with said predetermined length which is larger than said word bit length, and
    (f) determining from the results of the comparison between the sum bit length, which has thus been calculated, and said predetermined length which is larger than said word bit length, the position in the signal at which consecutive bits correspond to said predetermined code having a bit length which is larger than said word bit length.

7. A method as defined in claim 6, wherein said signal is an image signal representing an image.

8. A method as defined in claim 7, wherein said image signal is detected from the image by scanning the image along a plurality of main scanning lines, and said position in the signal, at which consecutive bits correspond to a predetermined code having a bit length larger than the word bit length, corresponds to the top of each group of signal components of the image signal, which represent picture elements in the image located along a single main scanning line.

9. A method as defined in claim 6, wherein said signal is a compressed image signal, which is obtained from compression processing carried out on an image signal representing an image.

10. A method as defined in claim 9, wherein said image signal was detected from the image by scanning the image along a plurality of main scanning lines, and said position in the signal, at which consecutive bits correspond to a predetermined code having a bit length larger than the word bit length, corresponds to the top of each group of signal components of the compressed image signal, which represent picture elements in the image located along a single main scanning line.

11. A method as defined in claim 1, wherein said first direction is opposite to said second direction.

12. A method as defined in claim 6, wherein said first direction is opposite to said second direction.

* * * * *